(12) United States Patent
de Vlieger et al.

(10) Patent No.: US 7,866,139 B2
(45) Date of Patent: *Jan. 11, 2011

(54) FIBRE-REINFORCED POLYMER COMPOSITES AND PROCESSES FOR PREPARING THE SAME

(75) Inventors: Jan J. de Vlieger, Eindhoven (NL); Theodoor M. Slaghek, Rotterdam (NL); Theodorus J. J. M. Kock, Stramproy (NL); Eric G. M. Craenmehr, Venlo (NL); Willem C. Drost, Zeist (NL); Mario T. R. van Wandelen, Zeist (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 978 days.

This patent is subject to a terminal disclaimer.

(21) Appl. No.: 11/628,715

(22) PCT Filed: Jun. 9, 2005

(86) PCT No.: PCT/NL2005/000417

§ 371 (c)(1), (2), (4) Date: Mar. 8, 2007

(87) PCT Pub. No.: WO2005/121223

PCT Pub. Date: Dec. 22, 2005

(65) Prior Publication Data

US 2008/0064793 A1 Mar. 13, 2008

(30) Foreign Application Priority Data

Jun. 9, 2004 (EP) ................................. 04076701

(51) Int. Cl.
*D02G 3/02* (2006.01)
*D01H 7/52* (2006.01)
*D02G 3/36* (2006.01)

(52) U.S. Cl. ................................ 57/295; 57/75; 57/257
(58) Field of Classification Search ................... 57/295, 57/75, 257
See application file for complete search history.

(56) References Cited

U.S. PATENT DOCUMENTS

| | | | |
|---|---|---|---|
| 5,203,156 A | * | 4/1993 | Yun .............................. 57/295 |
| 5,432,214 A | | 7/1995 | Lancesseur |
| 5,755,827 A | | 5/1998 | Bamford et al. |

FOREIGN PATENT DOCUMENTS

| | | |
|---|---|---|
| GB | 760148 | 10/1956 |
| GB | 1010425 | 11/1965 |
| GB | 1064534 | 4/1967 |
| WO | WO 96/39551 | 12/1996 |

OTHER PUBLICATIONS

International Search Report for PCT/NL2005/000417 mailed Sep. 1, 2005.

* cited by examiner

*Primary Examiner*—William K Cheung
(74) *Attorney, Agent, or Firm*—Nixon & Vanderhye P.C.

(57) ABSTRACT

The invention provides a fiber-reinforced polymer composite comprising fibers derived from mammalian hair and/or feathers, wherein the fibers have been prepared by means of a process comprising the steps of: (a) subjecting mammalian hair and/or feathers to an oxidation treatment in which the hair and/or feathers (is) are contacted with a solution, which comprises a bleaching agent; (b) separating the oxidized hair and/or feathers from the solution; and (c) drying the separated hair and/or feathers. The invention further provides processes to prepare said composite, a process to prepare said fibers, and shaped polymer products comprising said composite.

26 Claims, No Drawings

FIBRE-REINFORCED POLYMER COMPOSITES AND PROCESSES FOR PREPARING THE SAME

This application is the US national phase of international application PCT/NL2005/000417 filed 9 Jun. 2005, which designated the U.S. and claimed priority of EP 04076701.4 filed 9 Jun. 2004, the entire contents of each of which are hereby incorporated by reference.

The present invention relates to fibre-reinforced polymer composites and processes for preparing said composites, and shaped polymer products comprising said composites. The invention further relates to a process for preparing the fibres for use in the composites according to the present invention.

The use of fibres to reinforce polymer composites such as plastics is well known. The reinforcement brings about an improvement of the mechanical properties and the heat distribution temperature of composites. Additionally, the tendency to creep under continuous loading is reduced, and cost-savings are brought about because the need of fillers to obtain a similar stiffening is no longer needed. This enables fibre-reinforced composites to compete with metals in various fields of application. Hence, many shaped products are nowadays made of polymer composites that contain a substantial amount of fibres. For instance, in the automotive industry many shaped products comprise fibre-reinforced composites containing fibres in amounts of up to 75 weight percent. Since, the currently used fibres such as, glass-fibres, steel fibres, carbon fibres, aramide fibres and flax fibres are relatively expensive, there clearly exist room to develop alternative and less expensive fibrous materials that can suitably be used for these purposes.

It is further known from, for example, FR 908413A and GB P13779A that mammalian hair can be used in polymer products. The products so obtained leave, however, much room for improvement as far as the compatibility of the hair and the polymer is concerned.

Object of the present invention is to provide fibre-reinforced polymer composites that are based on mammalian hair and/or feathers and that display an improved compatibility with the polymer.

Surprisingly, it has now been found that this can be established by using mammalian hair and/or features that has been subjected to a particular pretreatment. Accordingly, the present invention relates to a fibre-reinforced polymer composite comprising fibres derived from mammalian hair and/or feathers, which fibres have been prepared by means of a process comprising the steps of:
(a) subjecting mammalian hair and/or feathers to an oxidation treatment in which the hair and/or feathers (is) are contacted with a solution, which comprises a bleaching agent;
(b) separating the oxidised hair and/or feathers from the solution; and
(c) drying the separated hair and/or feathers.

Although fibres can be derived from various types of mammalian hair and/or feathers, the hair of livestock is being preferred, one reason being its readily availability due to today's large, worldwide meat consumption. Another reason is the stiffness of the hair of livestock in combination with excellent mixing properties. Especially, the hair of pigs can very attractively be used in accordance with the present invention. One single type of mammalian hair can be used or a mixture of various different kinds of mammalian hair can be used. One type of feathers or a mixture of different types of feathers can be used. Also a mixture of one or more types of mammalian hair and one or more types of feathers can be used. In practice preference will be given to the use of one type of mammalian hair and/or one type of feathers. Preferably, only one type of mammalian hair is used.

It will be understood that the hair and/or feathers will have been separated from the mammals and/or birds concerned before the hair and/or feathers are subjected to the treatment in accordance with the present invention. Preferably, the fibres are derived from mammalian hair, more preferably mammalian hair from livestock, and more preferably hair from pigs.

The fibres can suitably be present in the composites according to the present invention in an amount in the range of from 10-75 weight percent, based on total composite, preferably 10-50 weight percent.

The fibre-reinforced polymer composite according to the present invention can suitably be a thermoplastic polymer composite or a thermosetting polymer composite. Suitable examples of thermoplastic polymer composites include biopolymer composites, polyolefins such as polyethylene and polypropylene, and/or starch. Preferably, the thermoplastic polymer composite comprises polyethylene or a biopolymer composite, preferably starch.

In a particularly attractive embodiment of the present invention the thermoplastic polymer composite comprises a biopolymer composite, preferably starch. It has surprisingly been found that shrink resistant products can be shaped from biopolymer composites containing the present cheap fibres, whereas previously relatively shrink resistant products could only be made from biopolymer composites to which expensive additives such as biodegradable polyesters were added.

Suitable examples of thermosetting polymer composites include, for instance, polyester composites, polyacrylate, and/or epoxy. Preferably, the thermosetting polymer composite comprises polyester When the fibre-reinforced polymer composite is a thermoplastic composite, the composite the fibres are preferably present in an amount in the range of from 10-40 weight percent, more preferably 20-40 weight percent.

When the fibre-reinforced polymer composite is a thermosetting composite the fibres are preferably present in an amount in the range of from 10-50 weight percent, more preferably 20-50 weight percent.

Thermosetting polymer composites or thermoplastic polymer composites according to the present invention can suitably be made by impregnating the fibres in the form of a non-woven material with a thermosetting composition or a thermoplastic composition, whereafter the impregnated composition obtained is subjected to a curing treatment. Such curing treatment can suitably be carried out in an oven or press at an elevated temperature and in the presence of a curing agent, for instance a peroxide. The fibres to be used in thermosetting polymer composites can suitably be derived from mammalian hair that has been shaved off mammals and/or feathers derived from birds.

Thermoplastic composites according to the present invention can suitably be made by extruding the fibres with a thermoplastic composition. The extruded composite so obtained can suitably be moulded to form a shaped fibre-reinforced polymer composite.

In a particularly attractive embodiment of the present invention, the fibres to be used in accordance with the present invention have been prepared by means of a process comprising the steps of:
(a) subjecting mammalian hair and/or feathers to an oxidation treatment in which the hair and/or feathers (is) are contacted with a solution, which comprises a bleaching agent;
(b) separating the oxidised hair and/or feathers from the solution;

(c) drying the separated hair and/or feathers; and
(d) subjecting the dried hair and/or feathers to a treatment in which the hair and/or feathers (is) are formed into fibres having an average particle size in the range of from 0.1 to 4 mm.

The fibres so obtained are particularly useful to reinforce thermoplastic polymer composites.

In the process according to the invention mammalian hair and/or feathers (is) are subjected in step (a) to an oxidation treatment, which is carried out in a solution comprising a bleaching agent. The solution comprises a solution that has been made alkaline (above pH 7) or acidic (below pH 7). Preferably, the solution has been made alkaline by the addition of NaOH, KOH and/or $NH_4OH$ or acidic by the addition of one or more (organic) acid(s). A wide variety of (organic) acids can be used, including for instance acetic acid and formic acid.

The pH value of the alkaline solution to be used in step (a) is preferably in the range of from 9 to 13, more preferably in the range of from 10 to 12, and the pH value of the acidic solution is preferably in the range of 3 to 7, more preferably in the range of from 4 to 6.

Suitable bleaching agents include organic and inorganic peroxides. Preferably, use is made of a bleaching agent selected from the group of hypo halides, perborates, percarbonates, persulphates, organic peroxides, or hydrogen peroxide. More preferably, the bleaching agent comprises hydrogen peroxide. One single bleaching agent or a mixture of different bleaching agents can suitably be applied in the alkaline or acidic solution. In the alkaline solution preferably one or more inorganic peroxides are used, whereas in the acidic solution preferably one or more organic peroxides are used. Suitably, the bleaching agent is used in an amount in the range of from 0.1% (w/w) to 40% (w/w), preferably in the range of from 0.3% (w/w) to 30% (w/w), based on total alkaline or acidic solution.

In step (a) the hair and/or feathers can suitably be contacted with the alkaline or acidic solution over a period of time in the range of from 5 minutes to 16 hours, preferably in the range of from 15 minutes to 10 hours. The temperature to be applied in step (a) is suitably in the range of from room temperature to 100° C., preferably in the range of from 30° C. to 80° C.

The hair to be oxidised in step (a) is preferably first subjected to a washing step in which soluble components, such as for instance blood, urine remnants and other animal components, are removed from the hair and/or feathers before the hair and/or feathers (is) are subjected to step (a).

The oxidised hair obtained in step (a) is subsequently separated in step (b) from the alkaline or acidic solution by means of a known technique. For this purpose use can, for instance, be made of a conventional filtering system.

In step (c) the hair and/or feathers which (has) have been separated in step (b) (is) are dried. The drying of the hair and/or feathers can be established by known techniques. The hair and/or feathers can for instance be dried using hot air or washing with a volatile solvent such as ethanol or methanol.

In step (d) the dried hair and/or feathers (is) are subjected to a treatment in which hair and/or feathers (is) are formed into fibres having an average particle size in the range of from 0.1 to 4 mm. The fibres can be made by grinding or refining the hair and/or feathers obtained in step (c). Preferably, the treatment in step (d) comprises a refining treatment in which fibres are obtained having an average particle size in the range of from 0.1 to 4 mm. Suitably, the refining treatment can be carried out by standard pulping and mill technology, known to the skilled person.

Preferably, the fibres have an average particle size in the range of from 1-3 mm, more preferably in the range of from 1.5-2.5 mm.

In case the fibres obtained in step (d) have been exposed to hydrophilic conditions, for instance due to storage before use, the fibres can again be subjected to a treatment as described in step (a). Hence, the present invention also relates to fibre-reinforced polymer composites comprising fibres derived from mammalian hair and/or feathers, which fibres have been obtained by a process, which comprises the steps of:
(a) subjecting mammalian hair and/or feathers to an oxidation treatment in which the hair and/or feathers (is) are contacted with a solution which comprises a bleaching agent;
(b) separating the oxidised hair and/or feathers from the solution;
(c) drying the separated hair and/or feathers;
(d) subjecting the dried hair and/or feathers to a treatment in which the hair and/or feathers (is) are formed into fibres having an average particle size in the range of from 0.1 to 4 mm; and
(e) subjecting the fibres so obtained to a treatment in which the fibres are contacted with a solution which comprises a deoxidation agent.

Suitable deoxidation agents include glycol acids such as thioglycolic acid and salts thereof, ammonium thioglyconate and thiolacetate. Preferably use is made of thioglycolic acid or one or more salts thereof. More preferably, use is made of one or more salts of thioglycolic acid. The deoxidation agent ensures that sulphur bonds present in the surface of the hair are deoxidised.

In step (e) the same conditions can be used as in step (a).

However, generally the conditions will be somewhat milder in step (e) when compared with step (a). Suitably, in step (e) the deoxidation agent is used in an amount in the range of from 0.1-10% (w/w), preferably in the range of from 0.2-4% (w/w), based on total alkaline solution.

In step (e) the fibres are preferably contacted with the alkaline solution over a period of time in the range of from 10 minutes to 3 hours, preferably in the range of from 30 minutes to 1 hour. The temperature to be applied in step (e) is suitably in the range of from 20 to 25° C.

In a preferred embodiment the fibres obtained in step (d) are first subjected to a denaturation treatment before they are subjected to step (e). In such denaturation treatment the surface structure of the fibres is opened. This can be established by contacting the fibres with a solution having a high concentration of hydroxide ions. Suitable solutions include solutions of ammonium hydroxide, potassium hydroxide and sodium hydroxide having pH values of at least 9, preferably at least 10, more preferably at least 11.

The fibres obtained in step (e) can suitably be subjected to a further treatment wherein they are contacted with a compound which enables the fibres to become more hydrophobic. Suitable compounds include diamines, monoamines, isocyanates and maleic acid anhydride. Such subsequent treatment has the advantage that the fibres become even more compatible with the polymer matrix.

The present invention further relates to a process for preparing fibres from mammalian hair and/or feathers which process comprises the steps of:
(a) subjecting mammalian hair and/or feathers to an oxidation treatment in which the hair and/or feathers (is) are contacted with a solution which comprises a bleaching agent;
(b) separating the oxidised hair and/or feathers from the solution; and
(c) drying the separated hair and/or feathers.

The present invention further relates to a process for preparing fibres from mammalian hair and/or feathers which comprises the steps of:
(a) subjecting mammalian hair and/or feathers to an oxidation treatment in which the hair and/or feathers (is) are contacted with a solution which comprises a bleaching agent;
(b) separating the oxidised hair and/or feathers from the solution;
(c) drying the separated hair and/or feathers; and
(d) subjecting the dried hair and/or feathers to a treatment in which the hair and/or feathers (is) are formed into fibres having an average particle size in the range of from 0.1 to 4 mm.

Preferably, the present invention relates to a process for preparing fibres from mammalian hair and/or feathers which comprises the steps of:
(a) subjecting mammalian hair and/or feathers to an oxidation treatment in which the hair and/or feathers (is) are contacted with a solution which comprises a bleaching agent;
(b) separating the oxidised hair and/or feathers from the solution;
(c) drying the separated hair and/or feathers;
(d) subjecting the dried hair and/or feathers to a treatment in which the hair and/or feathers (is) are formed into fibres having an average particle size in the range of from 0.1 to 4 mm; and
(e) subjecting the fibres so obtained to a treatment in which the fibres are contacted with a solution which comprises a deoxidation agent.

The fibres obtained with the above processes display an improved compatibility with respect to the thermoplastic or thermosetting composites, resulting in much improved homogeneous structures of the fibre-reinforced composites.

The present invention further relates to a shaped polymer product comprising a fibre-reinforced polymer composite according to the present invention. Such shaped polymer products include thermoplastic polymer products and thermosetting polymer products such as those derived from non-woven materials.

EXAMPLES

Example 1

To 25 g unsaturated polyester resin, 25 g sodium bentonite and 0.25 g aerosil, 2 wt % organic peroxide (perkadox 16) was added. A non-woven mat of 35 g consisting of hair of pigs was treated for 10 minutes to a solution of pH 11, dried and then in a uniform layer of the above formulation and the total was pressed with 2500 psig during 4 minutes at 90° C. After cooling tensile bars were made and a modulus of 400 N/mm² was measured.

Example 2

Low-density polyethylene (LDPE) and refined hair of pigs are mixed on a Collins roller during 5 minutes at a temperature of 120° C. This way homogeneous roller samples could be pressed at 130° C. with loadings of more than 40 wt %.

Example 3

LDPE and refined chicken feathers are mixed on a Collins roller during 5 minutes at a temperature of 120° C. This way homogeneous roller samples could be pressed at 130° C. with loadings of more than 40 wt %.

Example 4

A mixture of 50 wt % starch, 20 wt % water, 10 wt % glycerol, 10 wt % sorbitol and 10 wt % milled and pre-treated hair of pigs were extruded in an extruder. The hair of pigs was pre-treated during 10 minutes in an ammonium hydroxide solution with a pH of 11, whereafter the hair was dried and milled. The extruder strings were subsequently injection molded into tensile bars. Shrinkage of the tensile bars after storing at 50 RH for 40 days was 0.5%.

Comparative Example 1

To 25 g unsaturated polyester resin, 25 g sodium bentonite and 0.25 g aerosil, 2 wt % organic peroxide (perkadox 16) was added. A non-woven mat of 35 g consisting of hair of pigs was laid in a uniform layer of the above formulation and the total was pressed with 2500 psig during 4 minutes at 90° C. After cooling tensile bars were made and a modulus of 200 N/mm² was measured.

Comparative Example 2

A mixture of 50 wt % starch, 20 wt % water, 10 wt % glycerol, 10 wt % sorbitol were extruded in an extruder. The extruder strings were subsequently injection molded into tensile bars. Shrinkage of the tensile bars after storing at 50 RH for 40 days was 23%.

The invention claimed is:
1. A fibre-reinforced polymer composite comprising fibres derived from mammalian hair and/or feathers, wherein the fibres have been prepared by means of a process comprising the steps of:
(a) subjecting mammalian hair and/or feathers to an oxidation treatment in which the hair and/or feathers (is) are contacted with a solution which comprises a bleaching agent;
(b) separating the oxidised hair and/or feathers from the solution; and
(c) drying the separated hair and/or feathers; and
(d) subjecting the dried hair and/or feathers to a treatment in which the hair and/or feathers (is) are formed into fibres having an average fibre length in the range of from 0.1 to 4 mm.

2. A composite according to claim 1, wherein the fibres have been prepared by means of a process comprising the steps of:
(a) subjecting mammalian hair and/or feathers to an oxidation treatment in which the hair and/or feathers (is) are contacted with a solution which comprises a bleaching agent;
(b) separating the oxidised hair and/or feathers from the solution;
(c) drying the separated hair and/or feathers;
(d) subjecting the dried hair and/or feathers to a treatment in which the hair and/or feathers (is) are formed into a fibres having an average fibre length in the range of from 0.1 to 4 mm; and
(e) subjecting the fibres so obtained to a treatment in which the fibres are contacted with a solution which comprises a deoxidation agent.

3. A composite according to claim 1, wherein step (a) is carried out at a pH in the range of from 9-13.

4. A composite according to claim 3, wherein step (a) is carried out at a pH in the range of from 10-12.

5. A composite according to claim 2, wherein the fibres obtained in step (e) are subsequently contacted with a compound which enables the fibres to become hydrophobic.

6. A composite according to claim 1, wherein the fibres obtained in step (d) are firstly subjected to a denaturation treatment before they are subjected to step (e).

7. A composite according to claim 1, wherein the fibres are derived from mammalian hair.

8. A composite according to claim 7, wherein the mammalian hair is derived from livestock.

9. A composite according to claim 1, wherein the fibres are present in an amount in the range of from 10 to 50 weight percent, based on total composite.

10. A composite according to claim 1, wherein the composite comprises a thermoplastic composition.

11. A composite according to claim 10, wherein the fibres are present in an amount in the range of 20-40 weight percent, based on total composite.

12. A composite according to claim 1, wherein the composite comprises a thermosetting composition.

13. A composite according to claim 12, wherein the fibres are present in an amount in the range of from 20-50 weight percent, based on total composite.

14. A process for preparing a fibre-reinforced composite according to claim 10, wherein the fibres and a thermoplastic composition are extruded.

15. A process according to claim 14, wherein the composite obtained is moulded to form a shaped fibre-enforced polymer composite.

16. A process for preparing a fibre-reinforced polymer composite according to claim 12, wherein the fibres in the form of a non-woven material are impregnated with a thermosetting composition, whereafter the impregnated composite so obtained is subjected to a curing treatment.

17. A process for preparing fibres from mammalian hair and/or feathers which process comprises the steps of:
    (a) subjecting mammalian hair and/or feathers to an oxidation treatment in which the hair and/or feathers (is) are contacted with a solution which comprises a bleaching agent;
    (b) separating the oxidised hair and/or feathers from the solution; and
    (c) drying the separated hair and/or feathers; and
    (d) subjecting the dried hair and/or feathers to a treatment in which the hair and/or feathers (is) are formed into fibres having an average fibre length in the range of from 0.1 to 4 mm.

18. A process for preparing fibres from mammalian hair and/or feathers which process comprises the steps of:
    (a) subjecting mammalian hair and/or feathers to an oxidation treatment in which the hair and/or feathers (is) are contacted with a solution which comprises a bleaching agent;
    (b) separating the oxidised hair and/or feathers from the solution; and
    (c) drying the separated hair and/or feathers;
    (d) subjecting the dried hair and/or feathers to a treatment in which the hair and/or feathers (is) are formed into a fibres having an average fibre length in the range of from 0.1 to 4 mm; and
    (e) subjecting the fibres so obtained to a treatment in which the fibres are contacted with a solution which comprises a deoxidation agent.

19. A process composite according to claim 17, wherein the fibres obtained in step (e) are subsequently contacted with a compound which enables the fibres to become hydrophobic.

20. A process according to claim 17, wherein the fibres obtained in step (d) are firstly subjected to a denaturation treatment before they are subjected to step (e).

21. A shaped polymer product comprising a fibre-reinforced composite according to claim 1.

22. A composite according to claim 1, wherein steps (a) and (e) are carried out at a pH in the range of from 9-13.

23. A composite according to claim 4, wherein steps (a) and (e) are carried out at a pH in the range of from 10-12.

24. A fibre-reinforced polymer composite comprising fibres derived from mammalian hair, said mammalian hair being derived from pigs, wherein the fibres have been prepared by means of a process comprising the steps of:
    (a) subjecting mammalian hair and/or feathers to an oxidation treatment in which the hair and/or feathers (is) are contacted with a solution which comprises a bleaching agent;
    (b) separating the oxidised hair and/or feathers from the solution; and
    (c) drying the separated hair and/or feathers.

25. A fibre-reinforced polymer composite comprising fibres derived from mammalian hair and/or feathers, wherein the fibres have been prepared by means of a process comprising the steps of:
    (a) subjecting mammalian hair and/or feathers to an oxidation treatment at a pH in the range of from 9-12 in which the hair and/or feathers (is) are contacted with a solution which comprises a bleaching agent;
    (b) separating the oxidised hair and/or feathers from the solution; and
    (c) drying the separated hair and/or feathers,
    wherein the composite comprises polyolefins or starch.

26. A fibre-reinforced polymer composite comprising fibres derived from mammalian hair and/or feathers, wherein the fibres have been prepared by means of a process comprising the steps of:
    (a) subjecting mammalian hair and/or feathers to an oxidation treatment in which the hair and/or feathers (is) are contacted with a solution which comprises a bleaching agent;
    (b) separating the oxidised hair and/or feathers from the solution; and
    (c) drying the separated hair and/or feathers,
    wherein the composite comprises a polyester.

* * * * *